United States Patent [19]

Cline et al.

[11] Patent Number: 5,745,111
[45] Date of Patent: Apr. 28, 1998

[54] METHOD AND SYSTEM FOR AUTOMATIC PRESENTATION OF DEFAULT-DROP TARGET ICONS AT WINDOW BORDERS

[75] Inventors: Troy Lee Cline, Cedar Park; Ricky Lee Poston, Austin, both of Tex.

[73] Assignee: International Business Machines Corporation, Armonk, N.Y.

[21] Appl. No.: 748,667

[22] Filed: Nov. 13, 1996

[51] Int. Cl.⁶ ................................. G06F 3/14; G06F 3/00
[52] U.S. Cl. ........................... 345/348; 345/145; 345/333
[58] Field of Search ............................... 345/145, 119; 395/333, 335, 340, 342, 339, 338, 346, 348

[56] References Cited

U.S. PATENT DOCUMENTS

| | | | |
|---|---|---|---|
| 5,303,388 | 4/1994 | Kreitman et al. | 395/159 |
| 5,375,199 | 12/1994 | Harrow et al. | 395/159 |
| 5,396,590 | 3/1995 | Kreegar | 395/159 |
| 5,434,965 | 7/1995 | Matheny et al. | 395/159 |
| 5,452,414 | 9/1995 | Rosendahl et al. | 395/159 |
| 5,506,952 | 4/1996 | Choy et al. | 395/348 |
| 5,564,004 | 10/1996 | Grossman et al. | 395/348 |
| 5,583,984 | 12/1996 | Conrad et al. | 395/340 |
| 5,608,860 | 3/1997 | Fitzpatrick et al. | 395/352 |
| 5,630,080 | 5/1997 | Malamud et al. | 395/346 |
| 5,638,505 | 6/1997 | Hemenway et al. | 395/348 |

*Primary Examiner*—Raymond J. Bayerl
*Assistant Examiner*—Cao H. Nguyen
*Attorney, Agent, or Firm*—Richard A. Henkler; Andrew J. Dillon

[57] ABSTRACT

A method and system for automatically presenting default-drop target icons displayed within a data processing system. Default-drop target icons are representative of data processing system events, and the data processing system includes containers within a graphical user interface border. An object within a container surrounded by a graphical user interface border is selected and in response to initiation of dragging the icon, default-drop target icons are identified which are representative of data processing system events appropriate for the selected object. Thereafter, if the selected object is dragged across the graphical user interface border; at least one default-drop target icon is automatically displayed at a location proximate a point where the selected object crosses the graphical user interface border, in response to the dragging, such that a data processing system event may be invoked by dropping the selected object upon the default-drop target icon. As a result, the distance a selected object is dragged to invoke a data processing system event is minimized. A data processing system event is thereafter invoked in response to the object being dropped upon the default-drop target icon.

6 Claims, 5 Drawing Sheets

METHOD AND SYSTEM FOR AUTOMATIC PRESENTATION OF DEFAULT-DROP TARGET ICONS AT WINDOW BORDERS

BACKGROUND OF THE INVENTION

1. Technical Field

The present invention relates in general to an improved graphical user interface environment for a data processing system and in particular to improved graphical user interface icons which can perform data processing system events. Still more particularly, the present invention relates to the automatic presentation of default-drop target icons at graphical user interface window borders, which enable users to effectively and efficiently initiate data processing system.

2. Description of the Related Art

In graphical user interface environments, an icon is a small graphic image displayed on the screen to represent an object that can be manipulated by the user. Icons are often visual mnemonics; for example, a trash can represents a command for deleting unwanted text or files. Icons allows the user to control certain computer actions without having to remember commands, or type them at the keyboard. Icons are a significant factor in the "user-friendliness" of graphical user interfaces.

A graphical user interface is a type of display format that enables a user to choose commands, start programs, and see lists of files and other options by pointing to pictorial representations and lists of menu items on the screen. Choices can generally be activated either with a keyboard or a mouse. One type of pictorial representation commonly utilized in a graphical user interface environment is an icon. An icon is essentially an image depicted on the display of a computer as a symbolic representation of information about objects or processes available within that computer. Icons provide a preferable means of representing such information because icons can be quickly and easily identified by a user and because icons generally use less space than do standard textual representations of the same information. In addition, icons are generally considered to be more visually and logically appealing to users than text.

For application developers, graphical user interfaces offer an environment that efficiently handles direct interaction with the computer. Such an environment frees the developer to concentrate on a given application without becoming entangled in the details of a screen display or mouse and keyboard input. It also enables programmers to create programs to handle frequently performed tasks, such as saving a data file. The interface itself provides standard controlling mechanisms such as windows and dialog boxes. Another benefit is that applications written for a graphical user interface are device independent: as the interface changes to support new input and output devices, such as a large screen monitor or an optical storage device, the applications can, without modification, use those devices.

Many functions in a graphical user interface environment are accomplished by dragging an icon to a target icon that will "process" that object. For example, a user of a graphical user interface can typically drag a document to a printer icon and drop the document on that icon to print the document. The problem users face in doing so is that the user may have to drag the object a long distance across the screen to drop it upon the target icon, which can be a tedious, fatiguing, and error-prone task. This takes time and increases the likelihood of bad "drags" such as accidentally releasing the mouse button in mid-drag, resulting in an erroneous drop onto an unintended target or a drop to no target at all. Additionally, long drag increments can result in repetitive motion injuries to users wrists and arms. Some graphical user interface environments provide options for users from "pop-up" menus to perform actions on an object. However, many users forget or never discover these options and are uncomfortable with this particular method.

SUMMARY OF THE INVENTION

It is therefore an object of the invention to provide for an improved graphical user interface environment for a data processing system.

It is another object of the invention to provide improved graphical user interface icons which can perform data processing system events.

It is still another object of the invention to provide for the automatic presentation of default-drop target icons at graphical user interface window borders, which enable users to effectively and efficiently initiate data processing system events.

The above and other objects are achieved as is now described. A method and system for automatically presenting default-drop target icons displayed within a data processing system. Default-drop target icons are representative of data processing system events, and the data processing system includes containers within a graphical user interface border. An object within a container surrounded by a graphical user interface border is selected and in response to initiation of dragging the icon, default-drop target icons are identified which are representative of data processing system events appropriate for the selected object. Thereafter, if the selected object is dragged across the graphical user interface border; at least one default-drop target icon is automatically displayed at a location proximate a point where the selected object crosses the graphical user interface border, in response to the dragging, such that a data processing system event may be invoked by dropping the selected object upon the default-drop target icon. As a result, the distance a selected object is dragged to invoke a data processing system event is minimized. A data processing system event is thereafter invoked in response to the object being dropped upon the default-drop target icon.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
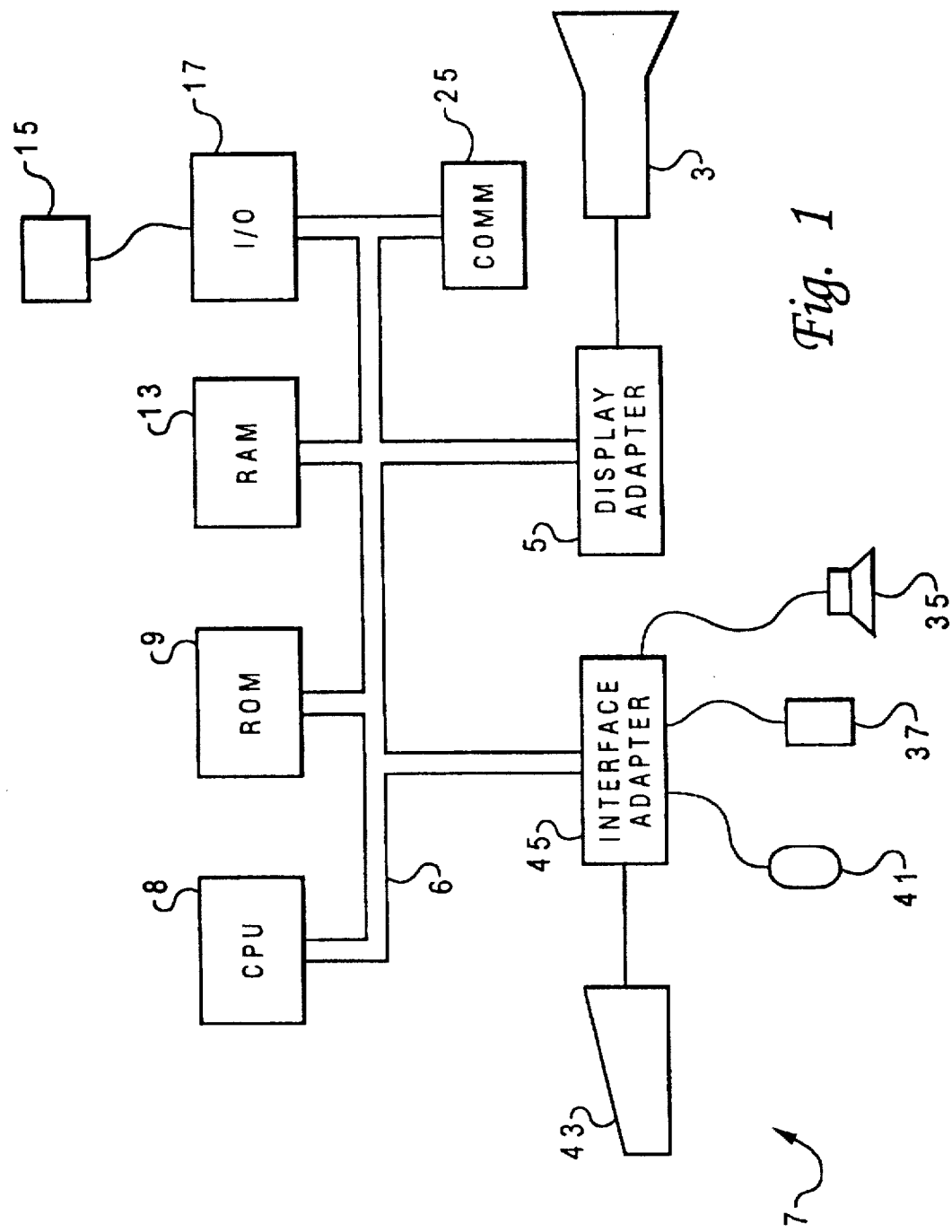
FIG. 1 illustrates a block diagram of a representative hardware environment in accordance with the method and system of the present invention.

With reference now to the figures and in particular with reference to FIG. 1, a representative hardware environment which may be utilized in accordance with the method and system of the present invention is depicted. A typical hardware configuration of a workstation 7 includes a central processing unit 8, such as a conventional microprocessor, and a number of other units interconnected via a system bus 6. Workstation 7 depicted if FIG. 1 includes a Random Access Memory (RAM) 13, Read Only Memory (ROM) 9, an I/O adapter 17 for connecting peripheral devices such as disk units 15 to system bus 6, a user interface adapter 45 for connecting a keyboard 43, a mouse 37, a speaker 35, a microphone 41, and/or other interface devices such as a touch screen device (not shown) to the bus, a communication adapter 25 for connecting the workstation to a data processing network and a display adapter 5 for connecting system bus 6 to a display device 3.

Figure 2:
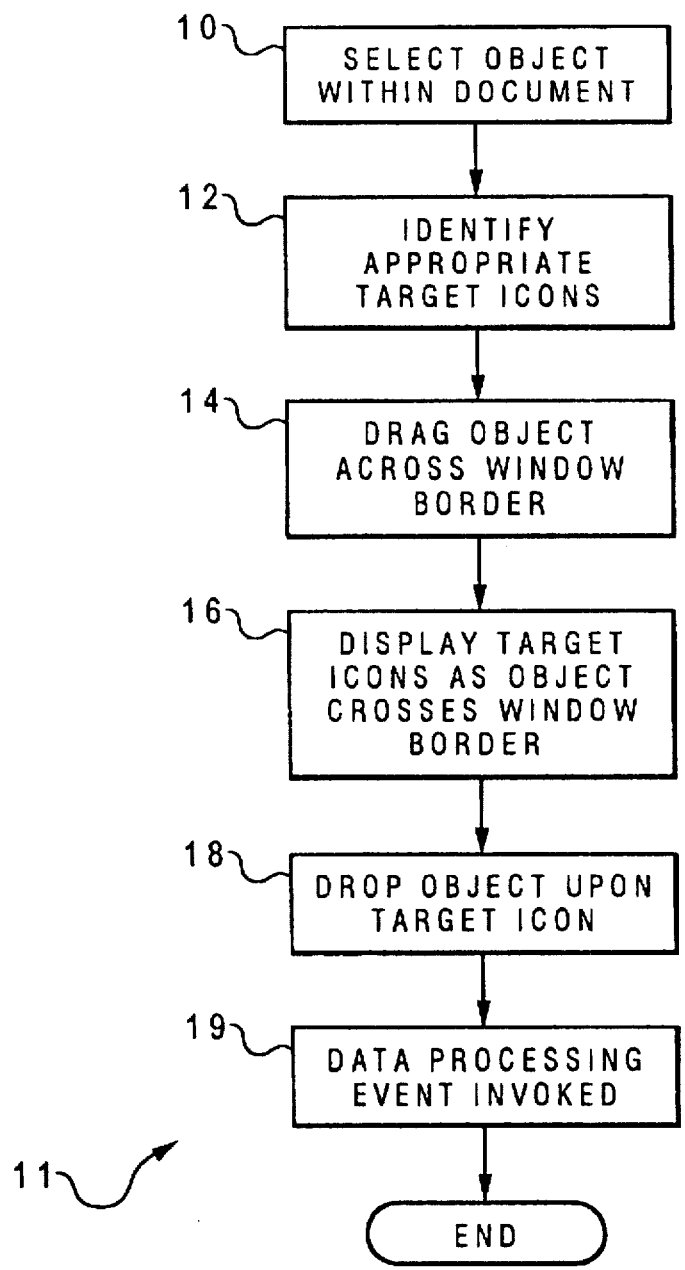
FIG. 2 depicts a high level logic flow chart of a method for presenting default-drop target icons at the edge of a graphical user interface in accordance with the method and system of the present invention.

FIG. 2 depicts a high level logic flow chart 11 of a method for presenting default-drop target icons at the edge of a graphical user interface in accordance with the method and system of the present invention. The default-drop target icons presented at the edge of the graphical user interface are representative of data processing system events. As illustrated at block 10, an object within the graphical user interface border is selected. The object can be selected, for example, by using a mouse or another pointing device. To select the object, the user presses one of the buttons on the mouse. As depicted at block 12, in response to the selection of an object, default-drop target icons are identified among a grouping of icons which are representative of data processing system events appropriate for the selected objected. For example, one default-drop target icon might represent a printing function. Another default-drop target icon might represent a deletion function and might be formed in the shape of a trash can icon. Also, for example, several default-drop target icons may be representative of varying types of printers. Only those printers which are appropriate for use in printing the selected object are identified. A dot matrix printer, for example, may not be as appropriate for printing a certain object as a laser printer.

The default-drop target icon is chosen by the data processing system based upon various logical strategies, including but not limited to the target most frequently used (e.g. the printer for document icons), the drop target last used, or a drop target hard-coded by a developer. As illustrated by block 14, the selected object is dragged by the user across the graphical user interface border. The border, can be, for example, the edge of a graphical user interface "window" (i.e. the window frame). Such a window frame, however, is not a necessary limitation of the present invention. The selected object can be dragged using a mouse or another pointing device, across the window frame.

As depicted at block 16, in response dragging the selected object, one or more of the identified default-drop target icons are automatically displayed at a location proximate a point where the selected object crosses the graphical user interface border. As described by block 18, the selected object is dropped upon a default-drop target icon, thus invoking, as depicted at block 19, a data processing system event (e.g. such as printing) and minimizing the distance the selected object is dragged to invoke the data processing system event. When the data processing system event is complete, the default-drop target icons are returned to their original position.

Figure 3:
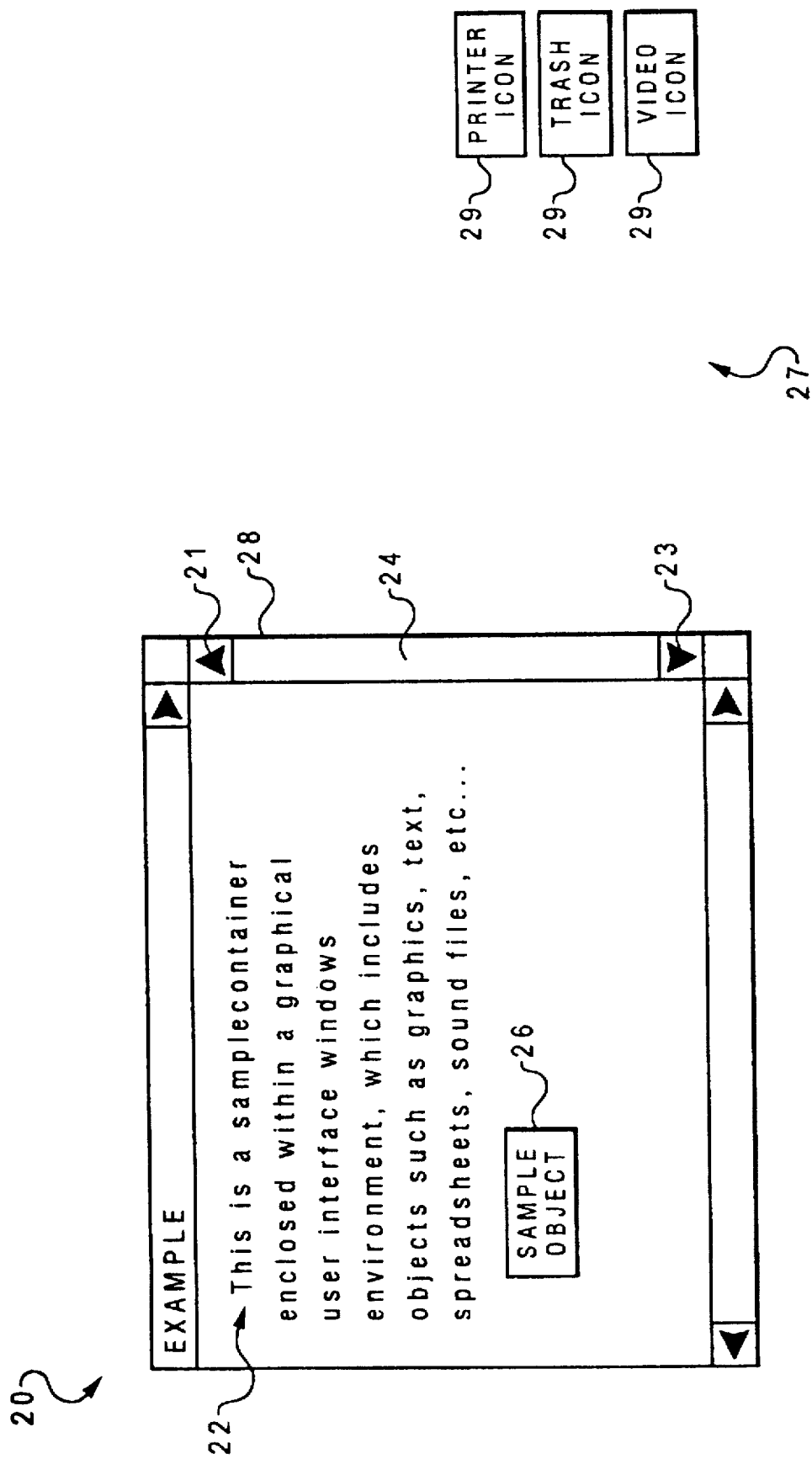
FIG. 3 illustrates a sample container, a sample object and target icons in a graphical user interface environment which may be utilized in accordance with the method and system of the present invention.

FIG. 3 illustrates a sample container, a sample object and target icons in a graphical user interface environment which may be utilized in accordance with the method and system of the present invention. In the example of FIG. 3, Window 20 displays a portion of a sample container 22, including a sample object 26, and is controlled by a conventional graphical user interface. A sample object 26 can be any type of object enclosed in a container. For example, sample object 26 might be a graphic, spreadsheet, text, even a sound or video file. Sample container 22 can contain multiple objects. A graphical user interface border 28 separates sample container 22 from a region 27 outside window 20. Target icons 29 are located, in the example of FIG. 3, in region 27 outside window 20. Target icons 29 can represent data processing events which "process" sample object 26 such as "print", "trash" or "video". Window 20, together with region 27 and target icons 29 can be referred to as a "desktop". In graphical user interface environments, a desktop is typically an on-screen area that uses icons and menus to simulate the top of a desk. Its intent is to make a computer easier to use by enabling users to move objects and icons and to start and stop tasks in much the same way as if they were working on a physical desktop.

In FIG. 3, target icons 29 are located at a large distance from border 28 of window 20. A user may, for example, choose to print object 26. In order to print object 26, the user must drag object 26 to printer icon 29 and drop it on printer icon 29 to print the document. In so doing, the user will have to drag the object a long distance across the computer system display screen to drop it upon printer icon 29, which can be a tedious, fatiguing, and error-prone task. This takes time and increases the likelihood of bad "drags" such as accidentally releasing the mouse button in mid-drag, resulting in an erroneous drop onto an unintended target or a drop to no target at all. Implementing flow diagram 11 of FIG. 2 with "default-drop" target icons solves this problem.

Figure 4:
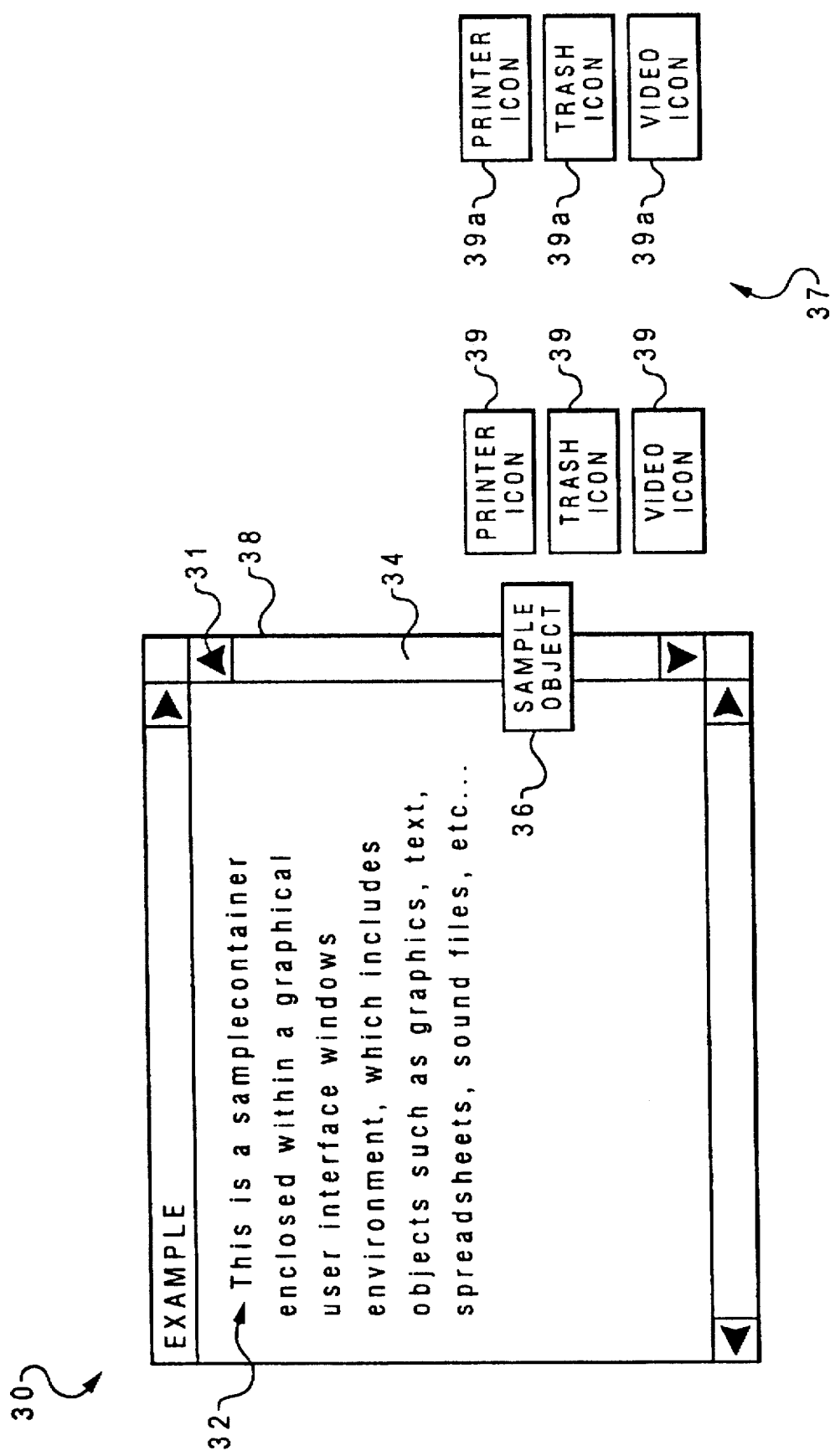
FIG. 4 depicts a sample container, a sample object and default-drop target icons in a graphical user interface environment which may be utilized in accordance with the method and system of the present invention.

FIG. 4 depicts a sample container 32, a sample object 36 and default-drop target icons 39 in a graphical user interface environment which may be utilized in accordance with the method and system of the present invention. In the example of FIG. 4, graphical user interface window 30 displays sample container 32, including sample object 36. Sample container 32 can contain multiple objects. A graphical user interface edge, border 38 (i.e. the window frame), separates sample container 32 from a region 37 outside window 30. In FIG. 4, sample object 36 has been dragged by a pointing device to a position over border 38. Window 30, together with region 27 and any icons or display objects, form a desktop graphical user interface which can be accessed by a user to initiate data processing system operations and events.

As sample object 36 crosses border 38 into region 37, default-drop target icons 39 appear in region 37 near sample object 36. Default drop target icons 39 are automatically presented at the edge of window 30 as sample object 36 is dragged out of the window 30. Sample object 36 can be moved to any default-drop target icon 39 and dropped the icon to invoke a data processing system event which "processes" sample object 36. If a user decides not to invoke default-drop target icon 39 and a subsequent data processing system event, the user simply drags sample object 36 past a default-drop target icon 39 and drops sample object 36 on another default-drop target icon 39. Alternatively, the user may move past all of the default icons and drop sample object 36 on another icon on the desktop such as target icons 39a. Target icons 39a of FIG. 4 are analogous to target icons 29 of FIG. 3. When sample object 36 crosses the border of the graphical user interface window, target icons 39a are copied to a location adjacent the border as default-drop target icons 30. Thus, when sample object crosses the border, the target icons located a far distance from the graphical user interface border are not moved to the new location near the sample object, but are actually copied to this new position.

In either case, the default-drop target icons 39 disappears when the dragged sample object 36 is dropped on a default-drop target icon. For example, if a user decides not to invoke a data processing system "printing" event upon sample object 36 and instead wishes to delete sample object 36 altogether, the user drags sample object 36 past printer icon 39 and drops sample object 36 on trash icon 39. Printer icon 39 and trash icon 39 will subsequently disappear.

Figure 5:
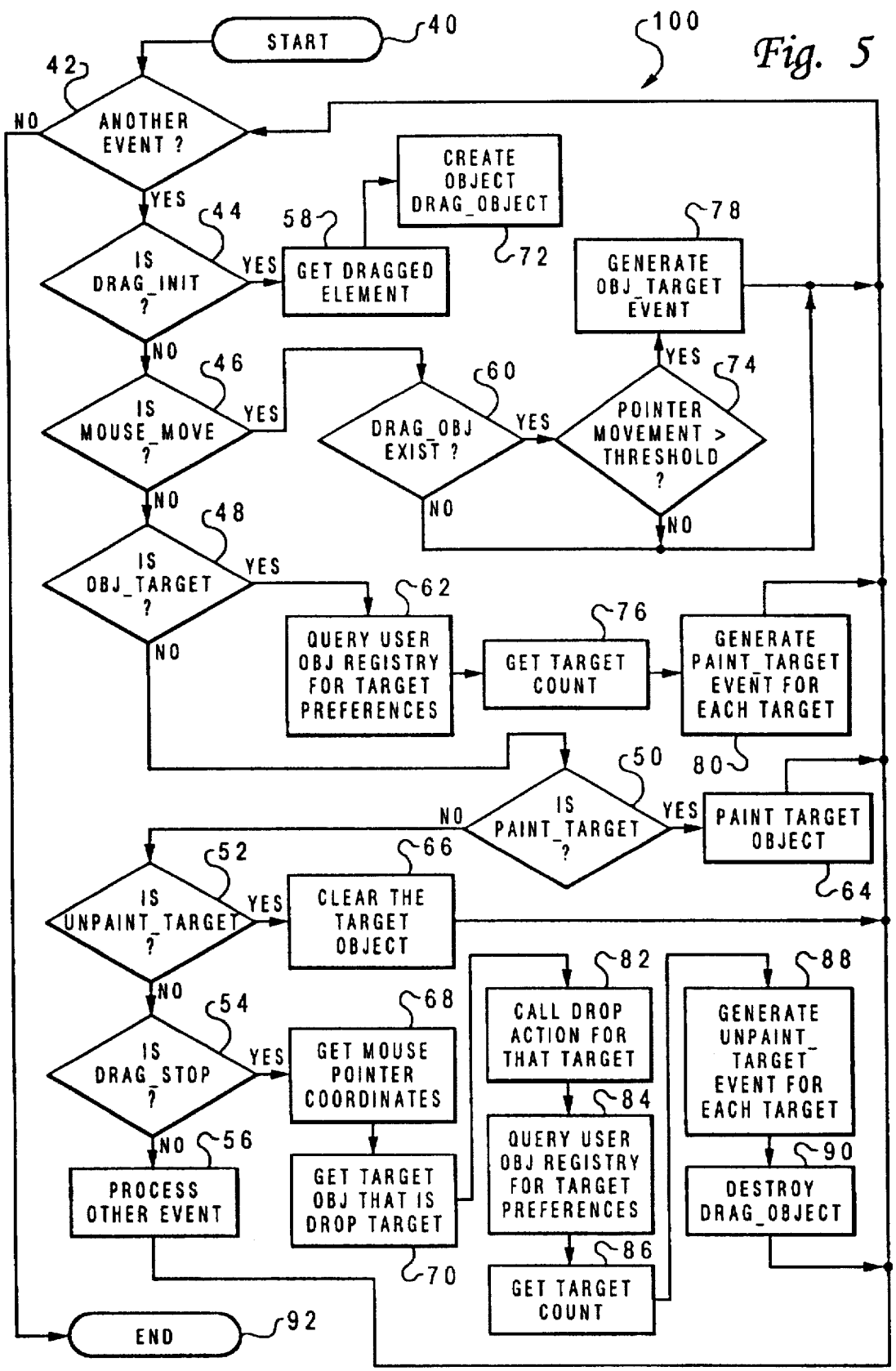
FIG. 5 illustrates a detailed logic flow chart illustrative of a method for presenting default-drop target icons at the edge of a graphical user interface which may be utilized in accordance with the method and system of the present invention.

FIG. 5 illustrates a detailed logic flow chart 100 illustrative of a method for presenting default-drop target icons at the edge of a graphical user interface which may be utilized in accordance with the method and system of the present invention. Logic flow chart 100 begins at block 40. As depicted at block 44, a decision is made whether a dragging event has occurred. If so, as illustrated at block 58, the location of the dragged object is found from pointer coordinates. As shown at block 72, the dragged object is created. When the object starts to be dragged, a mouse move event is initialized as illustrated at block 46. As depicted at block 60, if a dragged object exists, then as illustrated at block 74 a decision is made whether the pointer coordinates have moved more than a given movement threshold. If so, as depicted at block 78, an object target event is generated. As illustrated at block 48, a decision is made whether an object target event is needed. If so, as illustrated at block 62 a user object registry is queried for the preference default target(s) of the dragged object. As described at block 76, a user object registry is queried for a target count. As depicted at block 80 a paint target event is generated for each preference target up to the target count value.

As illustrated at block 50, a decision is made whether a paint target event is needed. If so, as illustrated at block 64 the target object is painted at the border plus a distance equal to the target width multiplied by a target number. As depicted at block 52, a decision is made whether an unpaint target event is desired. This event occurs after the user drops the dragged icon on a target. If so, as described at block 66, the target objects are erased. As illustrated at block 54, a decision is made whether the dragging event has ended. If so, as depicted at block 68 the coordinates of the mouse pointer are queried. As depicted at block 70, a determination is made regarding upon which target icon the dragged object was dropped. As described at block 82 an appropriate drop action for that dragged object is called. As illustrated at block 84, a user object registry for the preference target of the dragged object is queried. As illustrated at block 86, a user object registry for the target count is queried. As described at block 88, an unpaint target event for each preference target up to a target count value is generated. As shown at block 90, the dragged object is destroyed is destroyed. As illustrated at block 56, other events are processed and the process can begin again. Finally, as illustrated at block 92, the process ends.

Although utilized in the context of a "windows" environment, the present invention is not limited to a window environments. The present invention can be practiced in any defined region of an interface having defined borders. While the invention has been particularly shown described with reference to a preferred embodiment, it will be understood by those skilled in the art that various changes in form and detail may be made therein without departing from the spirit and scope of the invention.

What is claimed is:

1. A method for efficient invocation of data processing system events utilizing a plurality of target icons, wherein each of said target icons is representative of at least one data processing system event, and wherein said data processing system includes at least one container displayed within a graphical user interface border, comprising the steps of:

selecting an object within a container surrounded by a graphical user interface border;

identifying selected target icons among said plurality of target icons which are representative of data processing system events appropriate for said selected object in response to said selection;

dragging said selected object across said graphical user interface border; and automatically displaying at least one selected target icon at a location proximate a point where said selected object crosses said graphical user interface border in response to said dragging such that a data processing system event may be invoked by dropping said selected object upon said at least one selected target icon wherein a distance said selected object is dragged to invoke said data processing system event is minimized.

2. The method of claim 1 further including the step of invoking a data processing system event in response to said object being dropped upon said at least one selected target icon.

3. The method of claim 2 further including the step of returning said at least one selected target icon to an original display position of said at least one selected target icon.

4. A system for efficient invocation of data processing system events utilizing a plurality of target icons, wherein each of said target icons is representative of at least one data processing system event, and wherein said data processing system includes at least one container displayed within a graphical user interface border, comprising:

at least one container displayed within said data processing system within a graphical user interface border and surrounded by said graphical user interface border;

means for selecting an object within said at least one container;

means for identifying selected target icons among said plurality of target icons which are representative of data processing system events appropriate for said object;

means for dragging said object across said graphical user interface border;

means for automatically displaying at least one selected target icon at a location proximate a point where said object crosses said graphical user interface border; and means for invoking a data processing system event in response to said object being dropped upon said at least one selected target icon wherein a distance said object is dragged to invoke said data processing system event is minimized.

5. The system of claim 4 further including means for invoking a data processing system event in response to said object being dropped upon said at least one selected target icon.

6. The system of claim 5 further including means for returning said at least one selected target icon to an original display position of said at least one selected target icon.

* * * * *